United States Patent
Fields et al.

(10) Patent No.: US 10,810,504 B1
(45) Date of Patent: Oct. 20, 2020

(54) ROUTE SCORING FOR ASSESSING OR PREDICTING DRIVING PERFORMANCE

(71) Applicant: STATE FARM MUTUAL AUTOMOBILE INSURANCE COMPANY, Bloomington, IL (US)

(72) Inventors: Brian Mark Fields, Normal, IL (US); J. Lynn Wilson, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 948 days.

(21) Appl. No.: 15/008,846

(22) Filed: Jan. 28, 2016

Related U.S. Application Data

(60) Provisional application No. 62/131,582, filed on Mar. 11, 2015.

(51) Int. Cl.
G06N 5/04 (2006.01)

(52) U.S. Cl.
CPC .................... *G06N 5/048* (2013.01)

(58) Field of Classification Search
None
See application file for complete search history.

(56) References Cited

U.S. PATENT DOCUMENTS

| | | |
|---|---|---|
| 5,499,182 A | 3/1996 | Ousborne |
| 5,797,134 A | 8/1998 | McMillan et al. |
| 6,064,970 A | 5/2000 | McMillan et al. |
| 6,868,386 B1 | 3/2005 | Henderson et al. |
| 7,343,306 B1 | 3/2008 | Bates et al. |
| 7,343,310 B1 | 3/2008 | Stender |
| 7,812,712 B2 | 10/2010 | White et al. |
| 7,865,378 B2 | 1/2011 | Gay |
| 7,870,010 B2 | 1/2011 | Joao |
| 8,027,853 B1 | 9/2011 | Kazenas |
| 8,140,358 B1 | 3/2012 | Ling et al. |
| 8,332,242 B1 | 12/2012 | Medina, III |
| 8,423,239 B2 | 4/2013 | Blumer et al. |
| 8,489,433 B2 | 7/2013 | Altieri et al. |
| 8,508,353 B2 | 8/2013 | Cook et al. |
| 8,566,126 B1 | 10/2013 | Hopkins, III |
| 8,606,512 B1 | 12/2013 | Bogovich et al. |
| 8,606,514 B2 | 12/2013 | Rowley et al. |
| 8,612,139 B2 | 12/2013 | Wang et al. |
| 8,630,768 B2 | 1/2014 | McClellan et al. |
| 8,682,699 B2 | 3/2014 | Collins et al. |

(Continued)

*Primary Examiner* — Khaja Ahmad
(74) *Attorney, Agent, or Firm* — Marshall, Gerstein & Borun LLP

(57) ABSTRACT

In a computer-implemented method of assessing driving performance using route scoring, driving data indicative of operation of a vehicle while the vehicle was driven on a driving route may be received. Road infrastructure data indicative of one or more features of the driving route may also be received. A route score for the driving route may be calculated using the road infrastructure data, and a driving performance score for a driver of the vehicle may be calculated using the driving data and the route score for the driving route. Data may be sent to a client device via a network to cause the client device to display the driving performance score and/or a ranking based on the driving performance score, and/or the driving performance score may be used to determine a risk rating for the driver of the vehicle.

19 Claims, 5 Drawing Sheets

(56) References Cited

U.S. PATENT DOCUMENTS

| | | |
|---|---|---|
| 8,725,408 B2 | 5/2014 | Hochkirchen et al. |
| 8,996,234 B1* | 3/2015 | Tamari ................. G07C 5/0808 |
| | | 701/29.3 |
| 9,141,995 B1 | 9/2015 | Brinkmann et al. |
| 9,523,984 B1* | 12/2016 | Herbach ............... B60W 30/09 |
| 2002/0111725 A1 | 8/2002 | Burge |
| 2003/0191581 A1 | 10/2003 | Ukai et al. |
| 2004/0153362 A1 | 8/2004 | Bauer et al. |
| 2005/0267784 A1 | 12/2005 | Slen et al. |
| 2006/0049925 A1 | 3/2006 | Hara et al. |
| 2006/0053038 A1* | 3/2006 | Warren ................. G06Q 40/08 |
| | | 705/4 |
| 2006/0079280 A1 | 4/2006 | LaPerch |
| 2006/0247852 A1 | 11/2006 | Kortge et al. |
| 2007/0299700 A1 | 12/2007 | Gay et al. |
| 2009/0024419 A1 | 1/2009 | McClellan et al. |
| 2010/0030586 A1* | 2/2010 | Taylor ................... G06Q 40/08 |
| | | 705/4 |
| 2010/0066513 A1 | 3/2010 | Bauchot et al. |
| 2010/0131304 A1 | 5/2010 | Collopy et al. |
| 2010/0209882 A1* | 8/2010 | Lin ....................... G09B 19/167 |
| | | 434/65 |
| 2010/0238009 A1 | 9/2010 | Cook et al. |
| 2011/0153367 A1 | 6/2011 | Amigo et al. |
| 2012/0004933 A1 | 1/2012 | Foladare et al. |
| 2012/0109418 A1 | 5/2012 | Lorber |
| 2012/0109692 A1 | 5/2012 | Collins et al. |
| 2012/0136567 A1* | 5/2012 | Wang ................. G01C 21/3461 |
| | | 701/414 |
| 2012/0158436 A1 | 6/2012 | Bauer et al. |
| 2012/0197669 A1 | 8/2012 | Kote et al. |
| 2012/0209632 A1 | 8/2012 | Kaminski et al. |
| 2012/0209634 A1 | 8/2012 | Ling et al. |
| 2012/0214472 A1 | 8/2012 | Tadayon et al. |
| 2013/0013347 A1 | 1/2013 | Ling et al. |
| 2013/0013348 A1 | 1/2013 | Ling et al. |
| 2013/0046559 A1 | 2/2013 | Coleman et al. |
| 2013/0110310 A1 | 5/2013 | Young |
| 2013/0166326 A1 | 6/2013 | Lavie et al. |
| 2013/0289819 A1 | 10/2013 | Hassib et al. |
| 2013/0304515 A1 | 11/2013 | Gryan et al. |
| 2013/0317693 A1 | 11/2013 | Jefferies et al. |
| 2014/0039749 A1* | 2/2014 | Jelbert ................. B60W 40/09 |
| | | 701/32.1 |
| 2014/0074402 A1 | 3/2014 | Hassib et al. |
| 2014/0108058 A1 | 4/2014 | Bourne et al. |
| 2014/0180723 A1 | 6/2014 | Cote et al. |
| 2014/0257869 A1 | 9/2014 | Binion et al. |
| 2014/0304011 A1 | 10/2014 | Yager et al. |
| 2017/0088142 A1* | 3/2017 | Hunt ..................... B60W 30/08 |

\* cited by examiner

ROUTE SCORING FOR ASSESSING OR PREDICTING DRIVING PERFORMANCE

CROSS-REFERENCE TO RELATED APPLICATIONS

This claims the benefit of U.S. Provisional Patent Application No. 62/131,582, entitled "Route Scoring for Assessing or Predicting Driver Performance" and filed Mar. 11, 2015, the disclosure of which is hereby incorporated herein by reference in its entirety.

FIELD OF THE DISCLOSURE

The present disclosure generally relates to vehicle telematics and, more specifically, to systems and methods for assessing and/or predicting driving performance based on vehicle telematics data.

BACKGROUND

Current technologies used for insurance and fleet management collect vehicle telematics data to assess driving behavior. For example, the telematics data may be analyzed to determine the acceleration, braking and cornering of a vehicle, and the results of the analysis may be used to measure the performance of the driver of the vehicle over time. However, these measures of driving performance can be misleading. For example, two drivers who do most of their driving along their respective commutes to and from work may receive similar driving performance scores over a particular time span, and therefore may be considered to have similar risk profiles with respect to driving performance (e.g., for underwriting purposes). If the first driver commutes along a flat, straight route and the second driver commutes along a hilly route filled with turns, however, the second driver may have had to exhibit superior driving skills just to obtain the same score as the first driver. Other factors, such as driving in heavier traffic or worse visibility, may make the comparison between drivers even more misleading.

Because driving performance of different drivers is not compared in an "apples to apples" manner, drivers are at risk of being unfairly penalized for driving performance under relatively difficult circumstances. For their part, insurance providers may be unable to generate accurate risk profiles for determining premiums, and fleet managers may be unable to accurately determine how well a particular fleet driver drives relative to the rest of the fleet. Moreover, insurance providers and/or fleet managers may be unable to accurately predict how a driver's scores for driving performance in one area will translate to driving performance in another area (e.g., if the driver starts a new work route, moves to a new city, etc.).

BRIEF SUMMARY

The present embodiments may, inter alia, enable a fleet manager, insurance provider, or other individual or entity to make more meaningful comparisons of driving performance among different drivers by assigning scores to the routes driven by those drivers. Thus, for example, a fleet manager may more accurately identify the best and worst drivers in a fleet, and/or an insurance provider may more accurately assess risk for a number of different drivers. Additionally, or alternatively, the present embodiments may enable a fleet manager, insurance provider or other individual or entity to predict driving performance for drivers with respect to new or future routes. Thus, for example, an insurance provider may be able to determine an insurance rating for a driver planning to move to a new geographic area that has very different road characteristics than the driver's current area.

In one aspect, a computer-implemented method of assessing driving performance using route scoring may include receiving, by one or more processors, driving data indicative of operation of a vehicle while the vehicle was driven on a driving route, and receiving, by one or more processors, road infrastructure data indicative of one or more features of the driving route. The method may also include calculating, by one or more processors and using the road infrastructure data, a route score for the driving route, and calculating, by one or more processors and using (i) the driving data and (ii) the route score for the driving route, a driving performance score for a driver of the vehicle. The method may further include sending, via a network and by one or more processors, data to a client device to cause the client device to display one or both of (i) the driving performance score, and (ii) a ranking based on the driving performance score, and/or may include using, by one or more processors, the driving performance score to determine a risk rating for the driver of the vehicle.

In another aspect, a computer system for assessing driving performance using route scoring includes one or more processors, one or more hardware communication interfaces configured to communicate data, and a program memory coupled to the one or more processors. The program memory may store executable instructions that, when executed by the one or more processors, cause the computer system to receive, via the one or more hardware communication interfaces, driving data indicative of operation of a vehicle while the vehicle was driven on a driving route, receive, via the one or more hardware communication interfaces, road infrastructure data indicative of one or more features of the driving route, calculate, using the road infrastructure data, a route score for the driving route, and calculate, using (i) the driving data and (ii) the route score for the driving route, a driving performance score for a driver of the vehicle. The instructions may further cause the computer system to send, via the one or more communication interfaces, data to a client device to cause the client device to display one or both of (i) the driving performance score, and (ii) a ranking based on the driving performance score, and/or may cause the computer system to use the driving performance score to determine a risk rating for the driver of the vehicle.

In another aspect, a computer-implemented method of predicting driving performance using route scoring may include determining, by a hardware server, one or more driving performance scores indicative of past driving performance for a driver, determining, by the hardware server, one or more route scores indicative of difficulty of a driving route, and calculating, by the hardware server and using (i) the one or more driving performance scores and (ii) the one or more route scores, one or more predicted driving performance scores that predict driving performance for the driver on the driving route. The method may also include sending, via a network and by the hardware server, data to a client device to cause the client device to display the one or more predicted driving performance scores to an individual, and/or may include using, by the hardware server, the one or more predicted driving performance scores to determine a risk rating for the driver.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

DETAILED DESCRIPTION

Figure 1:
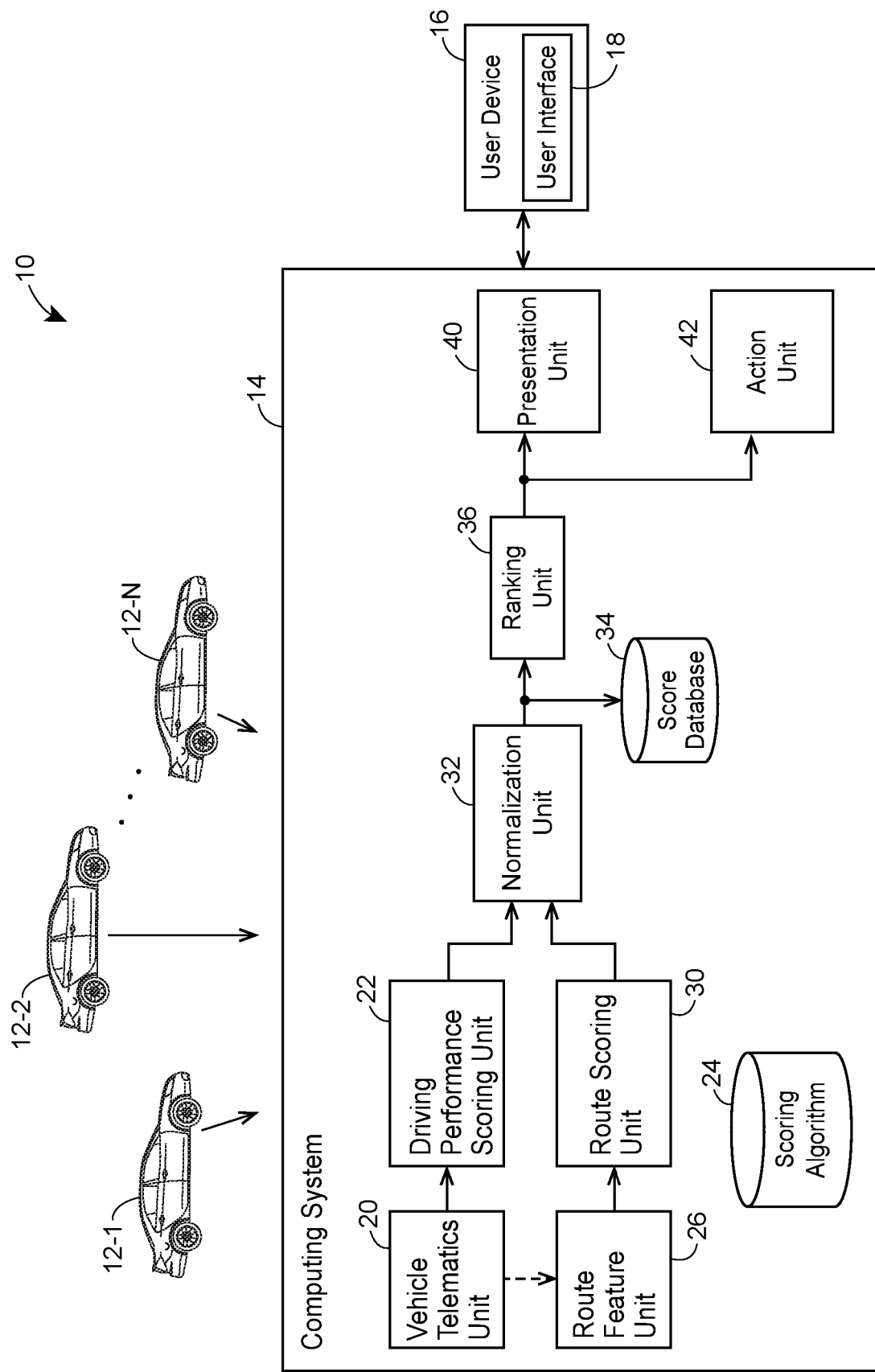
FIG. 1 depicts an exemplary environment including components associated with route scoring for assessing or predicting driving performance, according to an embodiment.

I. Exemplary Route Scoring for Assessing and/or Predicting Driving Performance

The present embodiments relate to systems and methods for providing more accurate driving risk assessments, comparisons and/or projections. For example, driver scores for driving performance on particular routes (e.g., scores for cornering, braking and accelerating, and/or other indicators of driving performance) may be normalized based on "route scores" that reflect the difficulty of driving those routes. In this manner, a group of drivers may be assigned scores that accurately represent their relative driving performance, even when the routes driven by those drivers tend to have very different features (e.g., different frequency, number and/or sharpness of curves, different frequency, magnitude and/or slope of elevation changes, etc.).

In different embodiments, the route scores may be calculated based on any of a variety of different static, semi-static or dynamic route features. For example, the route scores may be calculated based on one or more road infrastructure features, such as lane width, number of lanes, type of lane markings, road surface friction coefficient, elevation changes, curve parameters (e.g., frequency of curves, angle, radius, length, apex, bank, etc.), intersection parameters (e.g., intervals between intersections, whether a stoplight is present, whether the intersection is a four-way stop, etc.), signage parameters (e.g., size of sign, size of letters on sign, etc.), bicycle lane parameters (e.g., type, markings, location, etc.), and so on. As another example, the route score may instead (or also) be calculated based on the conditions in which the route was driven, such as weather conditions (e.g., snow, rain, fog, etc.), the presence or absence of road construction, traffic characteristics (e.g., traffic density, traffic direction, traffic flow, primary vehicle types in traffic, etc.), and so on. In addition to road infrastructure features and/or driving conditions, the route score may be calculated based on the length of the route. In other embodiments, route length may be implicitly considered by virtue of other parameters (e.g., number of curves/turns, number of intersections, etc.), or route length may not factor into the route score calculation.

The information needed to calculate a driving performance score may initially be generated by the sub-systems and/or sensors of a vehicle, and may be collected using a vehicle telematics system, for example. The route feature information needed to calculate a route score may initially be retrieved from a third party server (e.g., a mapping service server, a weather service server, etc.), retrieved from internal databases, and/or collected using a vehicle telematics system (e.g., if the vehicle acquired the route feature information using an external camera or other sensor, a vehicle-to-infrastructure (V2I) communication system, etc.), for example.

Normalized driving performance scores may be used in various ways to assess driving performance. For example, the normalized scores may be used to determine risk ratings for the drivers (e.g., for purposes of determining insurance policy premiums). As another example, the normalized scores may be displayed to a fleet manager (or other system user), who may directly compare the scores, and/or rankings based on those scores, with confidence that differences in route difficulty have been accounted for. Alternatively, raw (un-normalized) driving performance score may not be normalized using the route score, and the fleet manager or other system user may examine the route scores of different drivers to decide whether their driving performance scores may be fairly compared (e.g., the fleet manager may only compare driving performance scores for drivers who drove routes with similar route scores).

In some embodiments, route scores may instead (or also) be used to predict driving performance on a new route. For example, if a driver receives a first raw driving performance score for driving on a first route having a relatively high difficulty level (e.g., many sharp turns, many steep hills/slopes, etc.), it may be predicted that he or she would receive some higher raw driving performance score for driving on a second route having a relatively low difficulty level (e.g., more gradual curves, gentle elevation changes, etc.), and vice versa. In other embodiments, sub-scores for different aspects of driving performance may be used in conjunction with sub-scores for different measures of route difficulty in order to predict performance on the new route. For example, a driver may have earned a particular acceleration score, braking score and cornering score over a number of past driving trips, and a new route may be assigned a particular turn score (e.g., based on number of turns, turn radii, etc.), hill score (e.g., based on number of hills, hill slopes, hill lengths, etc.) and intersection score (e.g., based on number of intersections, signage or lights at intersections, etc.). A normalized/predicted driving performance score for the new route may then be calculated by processing the driving performance sub-scores and the route sub-scores according to a predetermined algorithm (e.g., an algorithm that weighs the driver's cornering score more heavily in connection with the route's turn score, weighs the driver's braking score more heavily in connection with the route's intersection score, and so on). Alternatively, the driving performance sub-scores may be specific to driving in a particular context. For example, the driver may have a hill score (or multiple hill scores, such as scores for hill acceleration, hill braking and hill cornering) that is specific to his or her past performance while driving on slopes (or while driving on slopes above some threshold slope, etc.). The algorithm may then calculate the normalized driving performance score by processing the driver's hill score in conjunction with the route's hill score.

Depending on the purpose for which driving performance on a new route is being predicted, the new route may be either an actual route or a hypothetical route that is representative of road characteristics typical to a geographic area. For example, a fleet manager may desire to see a predicted driving performance score for an actual, specific route when assigning (or deciding whether to assign) a driver to that route. On the other hand, an insurance provider may desire to see a predicted driving performance score for a purely hypothetical/modeled route when determining a risk rating for a customer planning to move to a geographic area. The hypothetical route may be modeled to include a set of route features typical to that geographic area (e.g., an approximate average turn radius for the area, or a set of turn radii representing a range of turns typical to the area, etc.), for example.

II. Exemplary Environment for Route Scoring to Assess and/or Predict Driving Performance FIG. 1 depicts an exemplary environment 10 in which route scoring may be used to assess and/or predict driving performance, according to an embodiment. As illustrated in FIG. 1, the environment 10 may include vehicles 12-1 through 12-N, a computing system 14, and a user device 16. The vehicles 12-1 through 12-N may include cars, vans, trucks, motorcycles, and/or any other vehicle type(s). The vehicles 12-1 through 12-N may be vehicles of a fleet, and the computing system 14 may be associated with a business, agency or organization maintaining the fleet. For example, the computing system 14 may include one or more servers of a shipping company, a public utility company, a public transportation company, a car rental company, a police department, a company with a mobile sales force, etc. In such an embodiment, the user device 16 may be a computing device of a fleet manager. Alternatively, the vehicles 12-1 through 12-N may be vehicles covered under insurance policies offered by an insurance provider, and the computing system 14 may be associated with (e.g., include one or more servers of) the insurance provider. In such an embodiment, the user device 16 may be a computing device of an insurance provider employee.

The user device 16 may be a terminal device, a personal computer, a laptop computer, a tablet, a smartphone, or any other suitable computing device in communication with the computing system 14. The user device 16 may communicate with the computing system 14 via one or more wired and/or wireless networks not shown in FIG. 1 (e.g., one or more local area networks (LANs), and/or one or more wide area networks (WANs) such as the Internet). Alternatively, the user device 16 may be a part of the computing system 14. The user device 16 may also include a user interface 18 having software and/or hardware components for displaying information to the user and/or accepting inputs from the user (e.g., a web browser application, a graphics card or chip, a monitor or touchscreen, a mouse, a keyboard, etc.).

Each of the vehicles 12-1 through 12-N may carry a vehicle telematics system capable of collecting data reflecting operation of the respective vehicle. For example, the vehicle telematics system in each of vehicles 12-1 through 12-N may include sensors and/or subsystems configured to collect any one or more of velocity information, acceleration information, braking information, steering information, location/position information (e.g., from a GPS system), translational and/or rotational G-force information, on-board diagnostic information, information collected by a camera, video camera, LiDAR, radar or other device sensing an environment external to the vehicle (e.g., proximity to other vehicles and/or other objects, orientation with respect to other vehicles and/or other objects, whether it is sunny, cloudy or dark, external temperature, etc.), automated safety and/or control system information (e.g., adaptive cruise control status and/or when cruise control is engaged/disengaged, forward and/or rear collision warning system outputs, lane departure system outputs, electronic stability control system status, etc.), whether seatbelts are in use, etc. In some embodiments, the vehicle telematics system of each of some or all of vehicles 12-1 through 12-N may also include sensors and/or subsystems configured to collect information about the driver, such as information indicative of the driver's attentiveness (e.g., how often the driver is scanning the environment and/or checking the mirror, how drowsy the driver appears to be, etc) and/or information indicative of the driver's emotional state (e.g., how anxious the driver appears to be, an amount of time spent in a negative emotional state, etc.). Methods and systems for collecting and/or analyzing telematics data to determine a driver's attentiveness and/or emotional state are described in U.S. patent application Ser. No. 14/282,437 ("Gaze Tracking for a Vehicle Operator" filed on May 20, 2014), U.S. patent application Ser. No. 14/255,934 ("Advanced Vehicle Operator Intelligence System" filed on Apr. 17, 2014) and U.S. patent application Ser. No. 13/717,514 ("System and Method to Adjust Insurance Rate Based on Real-Time Data About Potential Vehicle Operator Impairment" filed on Dec. 17, 2012), each of which is hereby incorporated herein by reference. Each vehicle telematics system may provide only raw data (e.g., sensor outputs), or may process some or all of the raw data to provide higher-level information (e.g., orientations of nearby objects, types of weather and/or road conditions, an indication of driver drowsiness and/or anxiety, etc.). In different embodiments, different ones of vehicles 12-1 through 12-N may have vehicle telematics systems that vary in certain respects, or all of the vehicles 12-1 through 12-N may be equipped with the same vehicle telematics systems.

Each of some or all of the vehicle telematics systems in the vehicles 12-1 through 12-N may be configured to enable transfer of the collected information to the computing system 14, where the data may be collected by a vehicle telematics unit 20. For example, each of some or all of the vehicles 12-1 through 12-N may be equipped with a communication system that includes a transmitter and one or more antennas to wirelessly transmit the data. Alternatively, each of some or all of the vehicles 12-1 through 12-N may be equipped with a Bluetooth system that provides the data to a smartphone or other portable device of the driver, and the smartphone or other portable device may transmit the data to the computing system 14 via a wireless network. In other embodiments, each of some or all of the vehicles 12-1 through 12-N may include an interface to a portable memory device, such as a portable hard drive or flash memory device. In some of these latter embodiments, the portable memory device may be used to download data from a vehicle 12 and then may be manually carried to the computing system 14. In still other embodiments, the portable memory device may be used to download data from a vehicle 12 to a driver's computer device (e.g., desktop computer, laptop computer, smartphone, etc.), which may in turn be used to transmit the data to the computing system 14 via wired and/or wireless networks.

The vehicle telematics unit 20 may provide the collected telematics data to a driving performance scoring unit 22, which may then calculate driving performance scores for the drivers of vehicles 12-1 through 12-N. For example, the vehicle telematics unit 20 may store the collected telematics data in one or more persistent memories of the computing system 14 (not shown in FIG. 1), and send driving performance scoring unit 22 an indication when new data is available. In various different embodiments, driving performance scoring unit 22 may generate different numbers and/or types of scores for each driver. For example, driving performance scoring unit 22 may generate multiple "trip" scores for each driver, a composite score for each driver (e.g., using multiple raw or weighted trip scores), scores relating to different types of vehicle operation (e.g., "smoothness" of acceleration, braking and/or cornering) for each driver, and/or context-specific scores (e.g., scores for driving on positive or negative slopes, scores for driving on an on-ramp or off-ramp, scores for driving in rainy weather, etc.) for each driver. Different types of context-specific scores, and methods and systems for generating context-specific scores, are described in U.S. Patent Application No. 62/131,496 ("Context-Specific Scoring of Driving Performance" filed on Mar. 11, 2015), the disclosure of which is hereby incorporated herein by reference. In an embodiment where context-specific scoring is implemented, the computing system 14 may also include a unit (not shown in FIG. 1) for determining the context(s) to be scored (e.g., based on input from a user of user device 16, or based on predetermined business rules, etc.). An example scoring algorithm that may be implemented by driving performance scoring unit 22 is discussed below in connection with FIG. 2. The algorithm(s) used by driving performance scoring unit 22 may be stored in a data storage 24 (e.g., read-only memory (ROM) or another type of persistent memory), or in another persistent memory external to the computing system 14 and not shown in FIG. 1, for example.

In addition to scoring driving performance, the computing system 14 may provide the ability to score routes (e.g., as a measure of route complexity or difficulty). To this end, a route feature unit 26 may determine one or more features of each route. The features may include static (or semi-static) features, such as route length and road infrastructure features, for example. Road infrastructure features may include any number of different features, such as lane widths for one or more road segments on each route, number of lanes for one or more road segments on each route, type of lane markings for one or more road segments on each route, road surface friction coefficients for one or more road segments on each route, elevation changes for one or more road segments on each route, curve parameters (e.g., frequency of curves, angle, radius, length, apex, bank, etc.) for one or more road segments on each route, intersection parameters (e.g., intervals between intersections, whether a stoplight is present, whether the intersection is a four-way stop, etc.) for one or more road segments on each route, signage parameters (e.g., size of sign, size of letters on sign, etc.) for one or more road segments on each route, bicycle lane parameters (e.g., type, markings, location, etc.) for one or more road segments on each route, and so on. The features may also (or instead) include one or more dynamic features, such as the conditions in which each route was driven. For example, the features may include weather conditions (e.g., snow, rain, fog, etc.) along one or more road segments of each route, the presence or absence of road construction along one or more road segments of each route, traffic characteristics (e.g., traffic density, traffic direction, traffic flow, primary vehicle types in traffic, etc.) along one or more road segments of each route, and so on.

Route feature unit 26 may collect the route feature information in various different ways, according to different embodiments and/or scenarios. For example, route feature unit 26 may request or otherwise retrieve some or all of the route feature information from a third party server (e.g., a mapping service server, a weather service server, etc.) via one or more wired and/or wireless networks. As another example, route feature unit 26 may retrieve some or all of the information from a data storage within the computing system 14 (not shown in FIG. 1). For example, the computer system 14 may have already obtained and stored route feature information for a particular route, or for a portion thereof. As still another example, route feature unit 26 may retrieve some or all of the information via vehicle telematics unit 20, as indicated by the dashed line/arrow in FIG. 1. The vehicle telematics data may include various types of data indicative of features of the routes taken by vehicles 12-1 through 12-N, such as camera data, LiDAR data and/or data that the vehicles 12-1 through 12-N received via vehicle-to-infrastructure (V2I) communications, for example. In some embodiments and scenarios, route feature information is collected from different sources for different routes (e.g., from a third party server for a route taken by vehicle 12-1, from both an internal data storage of computing system 14 and vehicle telematics unit 20 for a route taken by vehicle 12-2, etc.).

The route feature unit 26 may provide the collected route feature data to a route scoring unit 30, which may calculate one or more route scores for each route. For example, the route feature unit 26 may store collected telematics data in a persistent memory of the computing system 14 (not shown in FIG. 1), and send route scoring unit 30 an indication when new data is available. In some embodiments, route scoring unit 30 may generate multiple different types of scores (e.g., different "sub-scores" or "component scores"), and/or a score hierarchy, for each route. For example, route scoring unit 30 may generate component scores for each of multiple feature types on each route (e.g., a "hill score" calculated based on number and/or frequency of hills, hill slopes, etc., a "turn score" calculated based on number and/or frequency of turns/curves, turn radii, etc., and so on), and/or a composite score for each route (e.g., using multiple raw or weighted component scores). An example scoring algorithm that may be implemented by route scoring unit 30 is discussed below in connection with FIG. 3. The algorithm(s) used by route scoring unit 30 may be stored in data storage 24, or in another memory external to the computing system 14 and not shown in FIG. 1, for example.

A normalization unit 32 may generally use the raw driving performance scores generated by driving performance scoring unit 22, and the route scores generated by route scoring unit 30, to generate driving performance scores that are normalized to account for route features (e.g., to account for the difficulty level associated with driving a route having a particular feature set). For example, a relatively low driving performance score may be raised if the score was earned while the driver was driving a route scored as having a high difficulty level (e.g., many sharp turns, many steep elevation changes, heavy traffic, etc.), and/or a relatively high driving performance score may be lowered if the score was earned while the driver was driving a route scored as having a low difficulty level. As a relatively simple example, the raw driving performance score may be a number between 1 and 100, the route score may be a number between 1 and 100, and the normalized driving score may be equal to the raw driving performance score times the route score divided by 100. Normalization unit 32 may generate a single score for each driver/route combination, or may generate multiple scores for each driver/route combination. If driving performance scoring unit 22 generates context-specific scores, for example, normalization unit 32 may generate a normalized score for each context (e.g., a normalized hill score calculated using a hill driving performance score and a hill score for the route, a normalized turn score calculated using a turn driving performance score and a turn score for the route, etc.). The algorithm for calculating normalized driving performance scores from raw driving performance scores and route scores may be stored in a memory such as data storage 24, or in another memory external to the computing system 14 and not shown in FIG. 1, for example.

Normalized scores determined by normalization unit 32 may be added to a score database 34, which may be stored in a persistent memory, or in another memory external to the computing system 14 and not shown in FIG. 1, for example. Scores may also be provided to a ranking unit 36, which may use the normalized scores in conjunction with normalized scores of other drivers of vehicles 12-1 through 12-N to rank each driver. For example, ranking unit 36 may calculate a percentile rank for each normalized score of a driver, a curved-scale grade for each normalized score of a driver (e.g., A, B, C, D or F), or any other measure showing relative driving performance. Ranking unit 36 may calculate ranks for only a single score per driver, or for multiple scores per driver (e.g., scores corresponding to different types of vehicle operation, context-specific scores, etc.), for example. The rankings calculated by ranking unit 36 may be stored in score database 34, or in another memory external to the computing system 14 and not shown in FIG. 1, for example.

In an embodiment, ranks determined by ranking unit 36 may be provided to a presentation unit 40 and an action unit 42. Alternatively, or additionally, the normalized scores generated by normalization unit 32 may be provided to presentation unit 40 and action unit 42, and/or ranking unit 36 may be omitted. Presentation unit 40 may generate information specifying the presentation of the ranks and/or normalized scores on a display, and may send the information to user device 16 for display to the user (e.g., fleet manager, insurance provider employee, etc.) via user interface 18. The information may be provided via a web page, an email, a text message, and/or in any other suitable manner.

Action unit 42 may analyze the ranks and/or normalized scores to determine whether one or more actions should be taken with respect to any of the drivers. To this end, action unit 42 may utilize one or more thresholds. For example, action unit 42 may determine that action is advisable or required if a normalized score or rank falls below a particular threshold. As another example, in an embodiment where normalized scores are calculated for acceleration, braking and cornering for each driver, action unit 42 may determine that action is required or advised if any one of the normalized scores for a particular driver falls below a respective threshold.

The action taken or advised by action unit 42 may depend on whether the environment 10 is used in a fleet management setting or an insurance setting. If used for fleet management, for example, action unit 42 may cause an indication that the driver should be re-trained in that specific driving context to be provided to the fleet manager (e.g., via presentation unit 40 and user interface 18), and/or may automatically initiate a process that enters the driver in the re-training. As another example, if the relevant threshold(s) is/are exceeded, action unit 42 may cause an indication that the driver should be given a reward/incentive to be provided to the fleet manager (e.g., via presentation unit 40 and user interface 18), and/or may automatically initiate a process that gives the reward/incentive to the driver. In other embodiments, one or more other actions may be taken and/or suggested (e.g., suggesting that a driver scoring and/or ranking highly share his or her driving techniques with other fleet drivers, etc.).

If used in an insurance setting, action unit 42 may use the ranks and/or normalized scores to determine risk ratings for the drivers of vehicles 12-1 through 12-N, or may provide the ranks and/or normalized scores to a different computing system that handles risk underwriting, for example. Once a risk rating is determined for a driver, the rating may be used by action unit 42 (or another unit and/or computing system) to determine an insurance policy premium for that driver. The risk ratings may also, or instead, be provided to user device 16 for display via user interface 18 (e.g., using presentation unit 40).

To this point, the functionality of the computing system 14 has been described with respect to the use of route scores to more accurately assess past driving performance. The computing system 14 may also, however, use route scores to predict what driving performance score(s) a particular driver would likely receive when driving a new route (e.g., a route not yet driven, or a route that the driver has driven but for which the driver has not yet been scored, etc.). Two embodiments and/or scenarios corresponding to this predictive functionality will now be described.

In a first predictive embodiment, a fleet manager or insurance provider may wish to predict driving performance for a particular driver along a specific new route (e.g., a route the fleet manager has recently assigned, or is considering assigning, to the driver, or a new commute route that a policyholder will be driving in the near future, etc.). In this embodiment, the vehicle telematics unit 20 may collect data indicative of past driver performance as described above. The data may be indicative of the driver's performance while driving an old or current route for the driver (e.g., an old or current fleet route or commute, etc.), for example. Moreover, route feature unit 26 may collect route feature information for the new route as described above. In this first predictive embodiment, however, the route feature information does not correspond to the route that was driven while the driving data was generated, but rather corresponds to a different route (referred to here as the "new" route, regardless of whether the driver has actually driven that route yet). Driving performance scoring unit 22 and route scoring unit 30 may generate scores based on the driving data and the route feature information, respectively, according to any of the embodiments described above.

Normalization unit 32 may use the route score(s) and the raw driver performance score(s) to generate one or more normalized driving performance scores according to any of the embodiments described above. However, because the driving performance score(s) generated by driving performance scoring unit 22 pertain to past driving performance on one or more old routes, while the route score(s) generated by route scoring unit 30 pertain to a new route, the normalized score(s) generated by normalization unit 32 now represent predicted/projected score(s) for the driver when driving the new route.

While FIG. 1 shows driving performance scoring unit 22 providing scores to normalization unit 32, in some embodiments those scores are instead provided to and stored in score database 34, where they are retrieved at a later time by normalization unit 32 in order to predict performance on the new route. Moreover, while the first predictive embodiment has so far been described such that normalization unit 32 uses raw driving performance scores generated by driving performance scoring unit 22 to generate the predicted driving performance scores, pre-normalized driving performance scores may instead be used. At an earlier time, for example, normalization unit 32 may have generated one or more normalized driving performance scores for one or more old routes taken by a driver, and stored the score(s) in score database 34 (e.g., as described above for the nonpredictive scenarios/embodiments). Later, to determine the predictive score, normalization unit 32 may receive the route score(s) for the new route from route scoring unit 30, and retrieve the normalized driving performance score(s) from score database 34. By processing the new route score(s) along with normalized driving performance scores, and therefore taking into account the difficulty of the old route(s) for which past driving performance was measured, prediction accuracy may be improved.

Once normalization unit 32 has generated the predicted score(s), the score(s) (and/or rank(s) generated by ranking unit 36, if utilized) may be provided to presentation unit 40 and/or action unit 42. If the predicted score(s) and/or rank(s) are provided to presentation unit 40, for example, presentation unit 40 may provide the information to a fleet manager, insurance provider or other user/entity in any of the ways described above, and the recipient may consider the score(s) and/or rank(s) for any desired purpose. For example, a fleet manager may use predicted driving performance scores to determine which fleet drivers should get additional training for their recently assigned routes. As another example, a fleet manager may use predicted driving performance ranks to determine which fleet drivers should be assigned to which routes. As yet another example, an insurance provider may use predicted driving performance scores to determine an insurance risk rating and a corresponding premium (e.g., to provide a premium quote to a policyholder who is considering a switch to a job with a new commute). If the predicted score(s) and/or rank(s) are provided to action unit 42, action unit 42 may make any of the determinations described above, and automatically take action based on those determinations (e.g., cause presentation unit 40 to send a message to the fleet manager or a fleet driver to suggest additional training for the driver, to assign a fleet driver to a particular route and cause presentation unit 40 to inform the fleet manager and/or driver, to cause a risk rating and/or premium to be generated for a driver and cause presentation unit 40 to inform the insurance provider of the rating and/or premium, etc.).

In a second predictive embodiment, an insurance provider may wish to predict driving performance for a particular driver along a hypothetical/modeled route, rather than an actual route, in order to determine an appropriate risk rating for the driver. For example, the insurance provider may wish to determine a risk rating that a driver would be assigned (or a prediction/approximation of the risk rating that the driver would be assigned) if the driver were to move, or consider moving, to a new geographic area with different route characteristics than the old or current geographic area. The insurance provider may wish to determine the rating in order to provide a premium quote to a customer who is considering a move, and/or may wish to determine the actual premium that will be billed to the customer once the move occurs, for example.

The second predictive embodiment may be similar to the first predictive embodiment described above. In the second predictive embodiment, however, route feature unit 26 may determine static, semi-static and/or dynamic features not of routes existing in the real world, but rather of routes typical to a particular geographic area. For example, route feature unit 26 may determine average feature metrics for the area (e.g., average hill frequency, average hill slope, average turn frequency, average turn radius, average weather in a particular season, average traffic density, etc.), and/or may determine a set of features that mimics a full route (e.g., a particular sequence of hills, turns, intersections, etc.) without necessarily corresponding to any particular real-world route.

In some embodiments, each of some or all of units 20, 22, 26, 30, 32, 36, 40 and 42 may be (or may include) a respective set of one or more processors that executes software instructions to perform the functions described above, or some or all of the units 20, 22, 26, 30, 32, 36, 40 and 42 may share a set of one or more processors. Alternatively, each of some or all of units 20, 22, 26, 30, 32, 36, 40 and 42 may be a component of software that is stored on a computer-readable medium (e.g., a random access memory (RAM) and/or read-only memory (ROM) of the computing system 14) and executed by one or more processors of the computing system 14 to perform the functions described herein. In some embodiments, the computing system 14 may include more, fewer and/or different units than are shown in FIG. 1, including any of the components discussed elsewhere herein. For example, either presentation unit 40 or action unit 42 may be omitted, and/or ranking unit 36 may be omitted.

As can be seen from the above discussion, the components in the environment 10, when using the above techniques, may allow a fleet manager, insurance provider, or other individual or entity to more accurately assess a driver's performance, and/or more accurately predict how a driver would perform in a new driving environment. Moreover, the assessment and/or prediction may be made without manually delving into the details underlying an individual's driving performance scores, and without subjectively considering the various factors contributing to those scores. As such, the resource usage or consumption of the components in the environment 10 (e.g., in the computing system 14 and/or the user device 16) may be reduced. For example, fewer processor cycles may be utilized by the computing system 14 and/or the user device 16 if a fleet manager does not need to search for and analyze data underlying a particular fleet driver's score (e.g., data indicating how cornering performance impacted a driver's overall score, etc.).

III. Exemplary Driving Performance Scoring Algorithm

Figure 2:
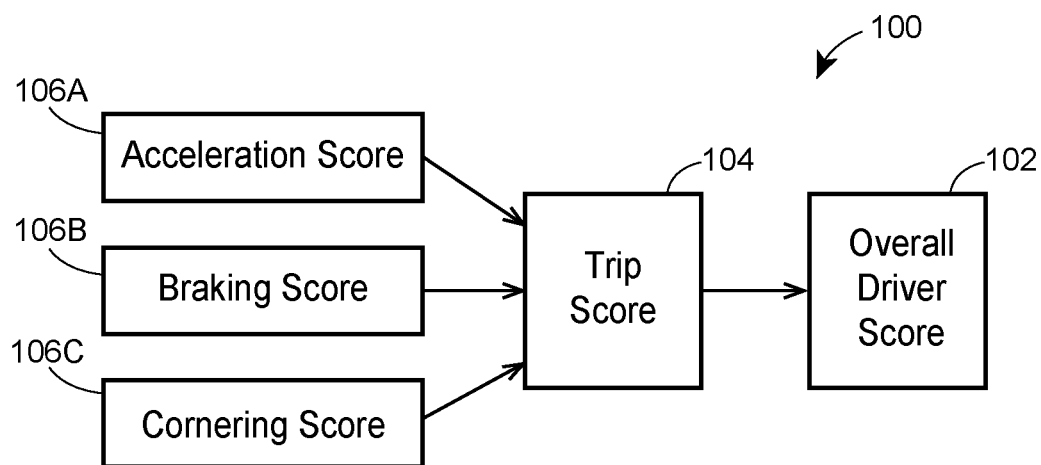
FIG. 2 depicts an exemplary driving performance scoring algorithm, according to an embodiment.

FIG. 2 depicts an exemplary driving performance scoring algorithm 100, according to an embodiment. The driving performance scoring algorithm 100 may be stored in the database 24 of FIG. 1, and used by driving performance scoring unit 22 to generate raw driving performance scores, for example. In the driving performance scoring algorithm 100, an overall driver score 102 is calculated for a driver (e.g., a driver of one of vehicles 12-1 through 12-N of FIG. 1) using a trip score 104, which may correspond to a single trip (e.g., a delivery route, a commute, etc.). Alternatively, trip score 104 may correspond to a particular time period during which the vehicle is driven (e.g., one day, one month, etc.). While FIG. 2 shows only a single trip score 104 for clarity, one or more additional trip scores calculated in a manner similar to trip score 104 may also be used, raw or weighted, to calculate the overall driver score 102.

The trip score 104 may be calculated using a plurality of component scores 106. In the example embodiment of FIG. 2, the component scores 106 include an acceleration score 106A indicative of the driver's acceleration behaviors (e.g., how smoothly the driver accelerates), a braking score 106B indicative of the driver's braking behaviors (e.g., how smoothly the driver brakes) and a cornering score 106C indicative of the driver's cornering behaviors (e.g., how smoothly the driver takes turns). In other embodiments and/or scenarios, however, the trip score 104 may be calculated using fewer component scores, more component scores, and/or different component scores than are shown in FIG. 2. For example, the trip score 104 may be calculated using a component score reflecting the driver's attentiveness (e.g., as measured by the driver's sensed eye and/or head movements), a component score reflecting the driver's use of turn signals, context-specific component scores (e.g., a score for performance while driving on slopes/hills, a score for performance while driving on on-ramps and/or off-ramps, etc.), and so on.

In some embodiments, more or fewer levels of scoring may be implemented. For example, component scores 106A, 106B and 106C may correspond to acceleration, braking and cornering, respectively, while driving on hills/slopes, and may be used to calculate a context-specific "hill sub-score." Similar techniques may be used to calculate one or more other context-specific sub-scores, and the plurality of context-specific sub-scores may then be used to calculate the trip score 104. As another example, the overall driver score 102 may be calculated directly from the scores 106A through 106C, and trip score 104 may be omitted. Moreover, scores may be weighted according to various criteria when used to calculate a higher-level score.

IV. Exemplary Route Scoring Algorithm

Figure 3:
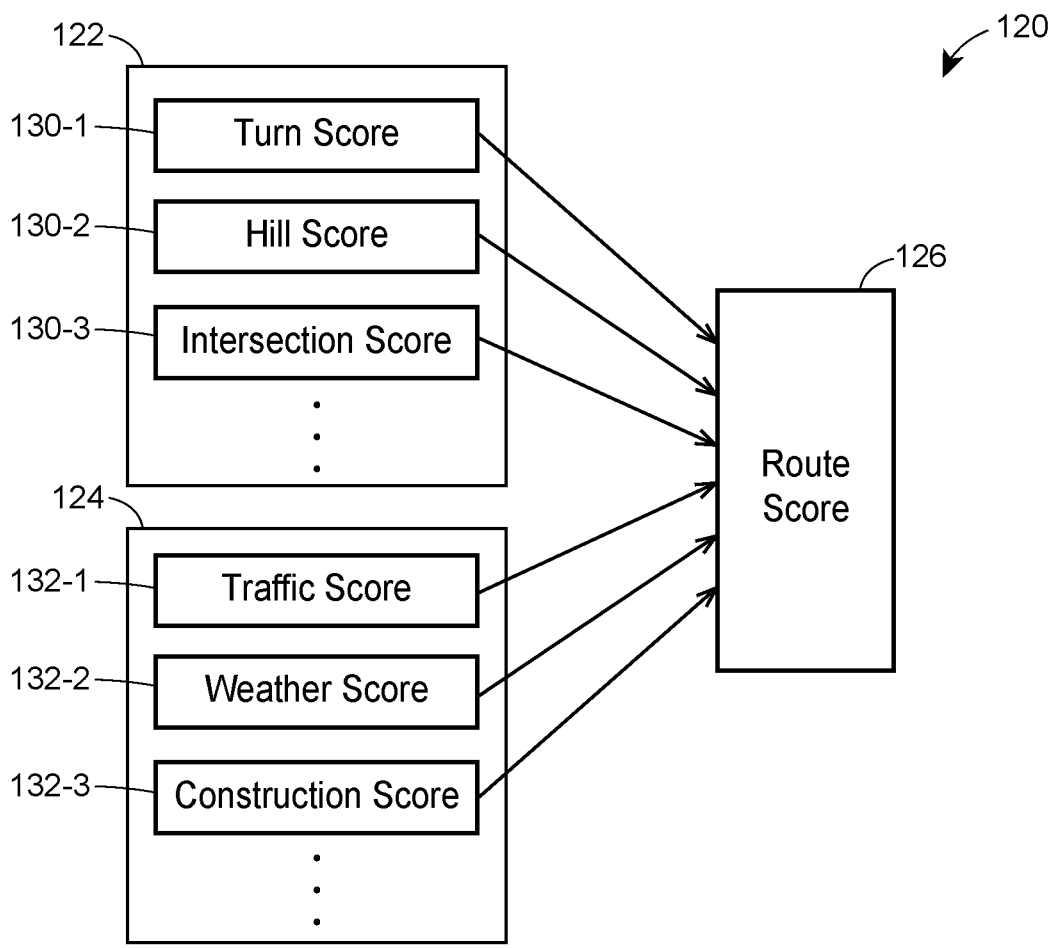
FIG. 3 depicts an exemplary route scoring algorithm, according to an embodiment.

FIG. 3 depicts an exemplary route scoring algorithm 120, according to an embodiment. The route scoring algorithm 120 may be stored in the database 24 of FIG. 1, and used by route scoring unit 30 to generate route scores, for example. In the example route scoring algorithm 120, a route score 126 may be calculated for a particular route (real or modeled/hypothetical, as discussed above) using a set of static and/or semi-static route feature sub-scores 122, and/or a set of dynamic route feature sub-scores 124. In the embodiment of FIG. 3, for example, sub-score set 122 may include a turn score 130-1, a hill score 130-2, an intersection score 130-3, and/or one or more other sub-scores specific to various other static and/or semi-static route features, and sub-score set 124 may include a traffic score 132-1, a weather score 132-2, a construction score 132-3, and/or one or more other sub-scores specific to various other dynamic route features. The sub-scores within the sub-score set 122 may be individually and/or collectively weighted, and/or the sub-scores within the sub-score set 124 may be individually and/or collectively weighted.

The turn score 130-1 may be generated using one or more features/parameters of turns/curves within the route to be scored. For example, the turn score 130-1 may be generated based upon the frequency of turns (e.g., turns per mile, etc.), the angles of turns/curves, the turn radii, the lengths of the turns, the turn apex, and so on. The hill score 130-2 may be generated using one or more features/parameters of hills/slopes within the route to be scored. For example, the hill score 130-2 may be generated based upon the frequency of hills (e.g., hills per mile having more than some threshold positive or negative slope, etc.), the slopes of hills, the lengths and/or elevation changes of hills, and so on. The intersection score 130-3 may be generated using one or more features/parameters of intersections within the route to be scored. For example, the intersection score 130-3 may be generated based upon the frequency of intersections (e.g., intersections per mile, etc.), intervals between intersections, types of signage or lights at intersections, whether intersections are four-way stops, and so on.

The traffic score 132-1 may be generated using one or more features/parameters of traffic along the route to be scored (e.g., traffic as it existed at, or generally around, the time that the driver performance data was generated). For example, the traffic score 132-1 may be generated based upon traffic density (e.g., estimated cars per 100 feet, or average distance between cars, etc.), traffic flow (e.g., traffic speed and/or consistency of traffic speed), traffic direction, primary types of vehicles in traffic (e.g., estimate of percentage of traffic due to large trucks, etc.), and so on. The weather score 132-2 may be generated using one or more features/parameters of weather along the route to be scored (e.g., weather as it existed at, or generally around, the time that the driver performance data was generated). For example, the weather score 132-2 may be generated based upon the presence or absence of rain, snow, fog, etc. The construction score 132-3 may be generated using one or more features/parameters of construction (road work) along the route to be scored (e.g., construction as it existed at, or generally around, the time that the driver performance data was generated). For example, the construction score 132-3 may be generated based upon the presence or absence of construction, the frequency of construction zones, the lengths of construction zones, the number of closed lanes, and so on.

In some embodiments, any of the scores shown in FIG. 3 may be weighted according to various criteria when used to calculate a higher-level score. Moreover, more or fewer levels of scoring may be implemented. For example, sub-score set 122, sub-score set 124, and route score 126 may represent only a first segment of a longer route, and route score 126 may be used along with one or more other route scores (raw or weighted, e.g., weighted by length) to determine a total score for the longer route.

V. Exemplary Method for Assessing Driving Performance Using Route Scoring

Figure 4:
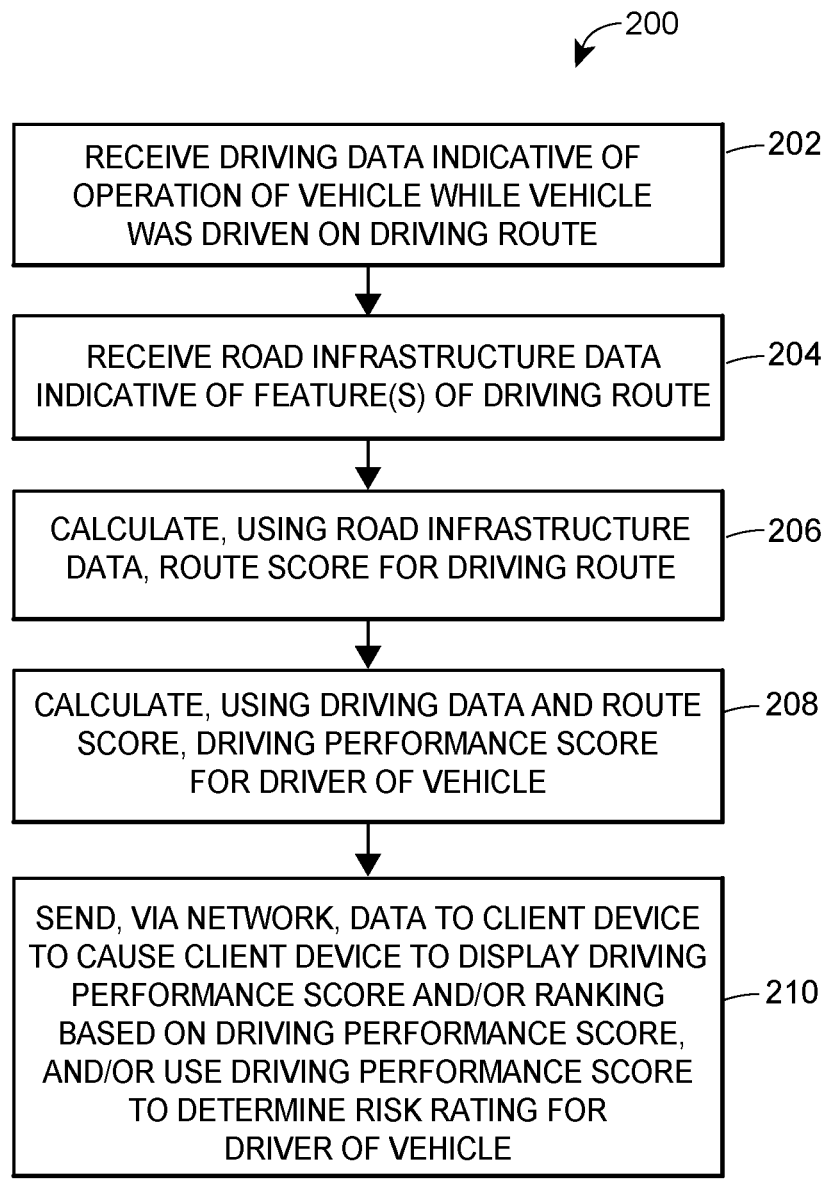
FIG. 4 depicts a flow diagram of an exemplary method for assessing driving performance using route scoring, according to an embodiment.

FIG. 4 depicts a flow diagram of an exemplary method 200 for assessing driving performance using route scoring, according to an embodiment. In one embodiment, the method 200 may be implemented in (e.g., performed by one or more processors of) a server or other computer device of a computing system, such as a server or other computer device within computing system 14 of FIG. 1, for example.

In the method 200, driving data indicative of operation of a vehicle while the vehicle was driven on a driving route may be received (block 202). Block 202 may be performed by a unit similar to vehicle telematics unit 20 of FIG. 1, for example. The driving data may be received by any suitable technique(s), such as any of the techniques for obtaining vehicle telematics data described above in connection with FIG. 1 (e.g., transferring driving data to/from a portable memory, using wired and/or wireless communications, etc.), for example. The driving data may be indicative of the operation of a vehicle over time. For example, the driving data may be indicative of acceleration, braking and/or cornering of the vehicle over time. The driving data may also be indicative of one or more other factors, such as translational and/or rotational G-force information, on-board diagnostic information, information collected by a camera, video camera, LiDAR, radar, or other device sensing an environment external to the vehicle (e.g., proximity to other vehicles and/or other objects, orientation with respect to other vehicles and/or other objects, etc.), automated safety and/or control system information (e.g., adaptive cruise control status and/or when cruise control is engaged/disengaged, forward and/or rear collision warning system outputs, lane departure system outputs, electronic stability control system status, etc.), whether seatbelts are in use, etc.

Road infrastructure data indicative of one or more features of the driving route may also be received (block 204). Block 204 may be performed by a unit similar to route feature unit 26 of FIG. 1, for example. The route features represented by the road infrastructure data may include any features reflecting the structure and/or configuration of portions of the road(s) of the route, and/or the signage and/or other traffic control infrastructure along the route, for example. As some non-limiting examples, the route features may include whether a road on the route is a rural road, whether a road on the route is an interstate road, whether a road on the route is a highway, whether a road on the route is a city street, total length of the route, number of lanes, type of lane markings, road surface characteristics (e.g., road surface friction coefficients, whether a road has a pavement, gravel, dirt or other surface, etc.), changes in road elevation, road curve characteristics (e.g., frequency of road curves, angles of road curves, lengths of road curves, apex locations of road curves and/or bank angles of road curves), road intersection characteristics (e.g., intervals between road intersections, whether road intersections have stoplights and/or whether road intersections have four-way stops), road signage characteristics (e.g., size of lettering on signs, etc.) and/or bicycle lane characteristics.

The road infrastructure data may be received from one or multiple sources, such as internal databases and/or a vehicle telematics system (e.g., data that the vehicle collected using a camera and/or another sensor configured to sense the environment external to the vehicle, data that the vehicle collected from one or more road infrastructure communication devices, etc.), and so on. As another example, some or all of the road infrastructure data may be received by receiving GPS data from the vehicle, using the GPS data to request the road infrastructure data from a remote server (e.g., a third party server accessible via a web-based mapping application), and then receiving the road infrastructure data in response to the request.

A route score for the driving route may be calculated using the road infrastructure data received at block 204 (block 206). Block 206 may be performed by a unit similar to route scoring unit 30 of FIG. 1, and/or using an algorithm similar to scoring algorithm 120 of FIG. 3, for example. Generally, the route score may reflect the difficulty of the route based on the road feature(s) reflected by the road infrastructure data (e.g., a higher route score to reflect a route having more frequent and/or sharper turns, more frequent and/or steeper hills, etc.). In some embodiments, the route score may be calculated in multiple steps. For example, a plurality of route feature scores (e.g., a respective route feature score for each of at least some of the driving route feature(s) indicated by the road infrastructure data) may be calculated using the road infrastructure data, and then the (total) route score may be calculated using the plurality of route feature scores according to a suitable algorithm.

A driving performance score for a driver of the vehicle may be calculated using the driving data received at block 202 and the route score calculated at block 206 (block 208). Block 208 may be performed by a unit similar to normalization unit 32 (and possibly also driving performance scoring unit 22) of FIG. 1, and/or using an algorithm similar to scoring algorithm 100 of FIG. 2, for example. In some embodiments, the driving performance score may be calculated in multiple steps. For example, an initial or "raw" driving performance score may be calculated using the driving data, and then the initial driving performance score may be normalized using the route score according to a suitable algorithm. Generally, the initial driving performance score may be increased for a higher route score, or decreased for a lower route score. In other embodiments, no raw driving performance score is calculated, and a final driving performance score is instead calculated using an algorithm that operates directly on the route score and the driving data (e.g., by ignoring more "bad" driving events for higher route scores, etc.).

Data may be sent, via a network, to a client device to cause the client device to display the driving performance score calculated at block 208 (and/or a ranking based on that driving performance score), and/or the driving performance score may be used to determine a risk rating for the driver of the vehicle (block 210). Block 210 may be performed by a unit similar to presentation unit 40 and/or action unit 42 of FIG. 1. The client device may be a device similar to user device 16 of FIG. 1, for example. If the data is sent to a client device, the data may be sent to the client device via a web page, an email, a text message, or via any other suitable technique. If a risk rating is determined using the score, various other factors may also be used to determine the rating (e.g., demographic information about the driver, the driver's moving violation and/or claims history, etc.).

In some embodiments, the blocks of the method 200 are not performed in the order shown in FIG. 4. For example, block 202 may be performed after and/or in parallel with block 204 and/or 206. Moreover, in some embodiments, the method 200 may include one or more blocks not shown in FIG. 4. For example, the method 200 may include a first additional block in which additional driving data, indicative of operation of the vehicle while the vehicle was driven on a different driving route, is received, a second additional block in which additional road infrastructure data, indicative of one or more features of the different driving route, is received, and a third additional block in which a route score for the different driving route is calculated using the additional road infrastructure data. The driving performance score may then be calculated (at block 208) using not only the driving data received at block 202 and the route score for the driving route calculated at block 206, but also the additional driving data and the route score for the different driving route. For example, the route scores for both driving routes may be used to normalize separate driving performance scores for the two routes, and the normalized driving performance scores may then be used to calculate the (total) driving performance score at block 208.

As another example, the method 200 may include an additional block in which driving conditions data is received. The driving conditions data may be indicative of weather conditions along the driving route, a state of one or more roads along the driving route, construction along the driving route, and/or traffic along the driving route (e.g., traffic density along the route, traffic direction along the route, speed of traffic along the route, and/or vehicle types in traffic along the route), for example. The route score may then be calculated (at block 204) using both the driving conditions data and the road infrastructure data.

As yet another example, in an embodiment where a risk rating is determined at block 210, the method 200 may include an additional block in which the risk rating is used to determine an insurance policy premium (e.g., the total premium, or a premium discount, etc.) for the driver of the vehicle.

VI. Exemplary Method for Predicting Driver Performance Using Route Scoring

Figure 5:
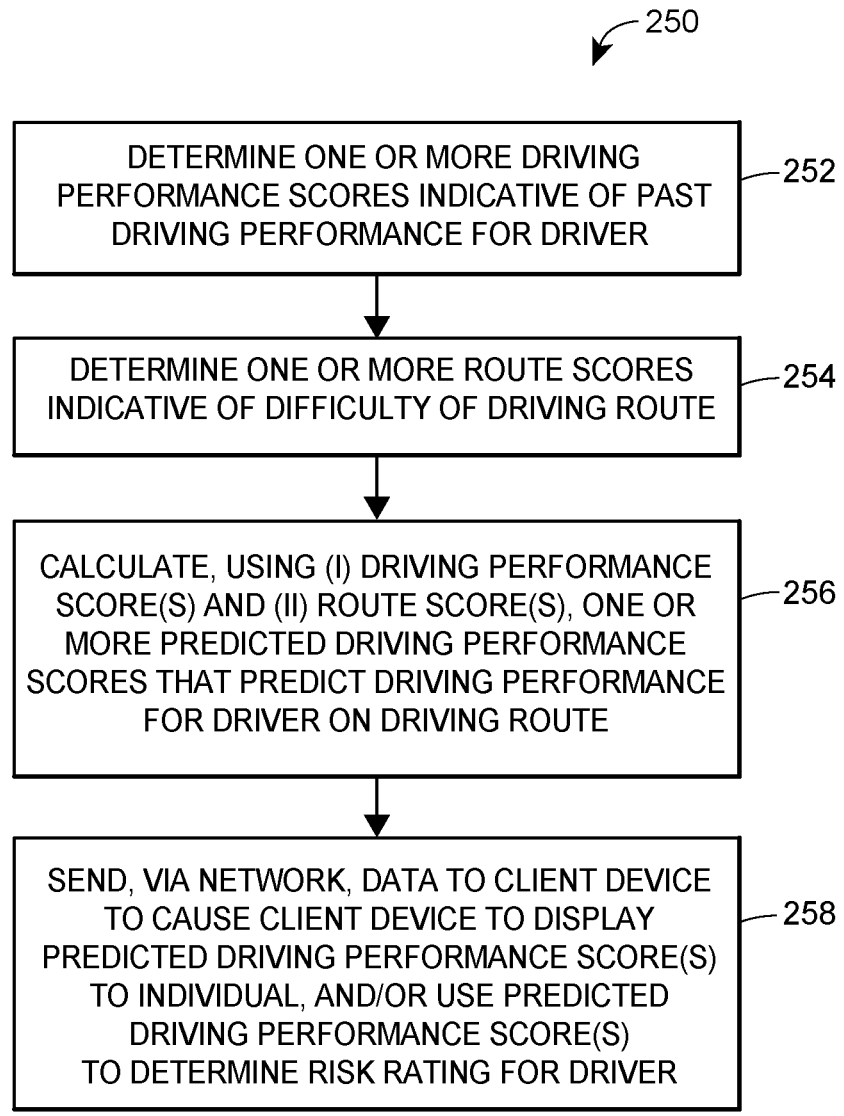
FIG. 5 depicts a flow diagram of an exemplary method for predicting driving performance using route scoring, according to an embodiment.

FIG. 5 depicts a flow diagram of an exemplary method 250 for predicting driving performance using route scoring, according to an embodiment. In one embodiment, the method 250 may be implemented in (e.g., performed by one or more processors of) a server or other computer device of a computing system, such as a server or other computer device within computing system 14 of FIG. 1, for example.

In the method 250, one or more driving performance scores indicative of past driving performance for a driver may be determined (block 252). Block 252 may be performed by a unit similar to driving performance scoring unit 22 of FIG. 1, or by another unit accessing driving performance scores stored in score database 34, for example. The driving performance score(s) may be determined by receiving driving data and calculating the score(s) (e.g., using an algorithm similar to scoring algorithm 100 of FIG. 2), or may be determined by receiving a pre-calculated driving performance score (e.g., from an internal database, from a third party, from a user when entered via a user interface similar to user interface 18 of FIG. 1, etc.), for example. Moreover, the driving performance score(s) may be raw scores, or may previously have been normalized using one or more route scores (e.g., using scores for the route(s) for which driving performance was measured to arrive at the driving performance score(s)). In some embodiments and/or scenarios where multiple driving performance scores are determined, each of at least some of the scores may be indicative of performance with respect to a different type of vehicle operation (e.g., acceleration, braking and/or cornering), or with respect to a different context in which the driving occurred (e.g., interstate driving, school zone driving, driving on hills, driving in rain, etc.).

One or more route scores indicative of the difficulty of a driving route may be determined (block 254). Block 254 may be performed by a unit similar to route scoring unit 30 of FIG. 1, for example. The route score(s) may be determined by receiving road infrastructure data and/or driving conditions data for the driving route and then calculating the score(s) (e.g., using an algorithm similar to scoring algorithm 120 of FIG. 3), or may be determined by receiving a pre-calculated route score (e.g., from an internal database, from a third party, from a user when entered via a user interface similar to user interface 18 of FIG. 1, etc.), for example. In some embodiments and/or scenarios where multiple route scores are determined, each of at least some of the scores may be indicative of difficulty with respect to a different type of road infrastructure included in the driving route (e.g., curves in the driving route, elevation changes in the driving route, etc.). Moreover, in some embodiments, one or more of the route scores may be indicative of difficulty with respect to expected driving conditions for the driving route (e.g., expected or typical weather conditions along the route, construction along the route, traffic density along the route, traffic direction along the route, speed of traffic along the route, vehicle types in traffic along the route, etc.). The driving route for which one or more route scores are calculated may be an actual, real-world route, or may be a hypothetical/modeled/virtual route. For example, the route score(s) may reflect the difficulty of a virtual route having a series of features typical of a particular geographic area (e.g., a typical hill slope/frequency, a typical curve sharpness/frequency, etc., a typical level of visibility due to weather, etc.).

One or more predicted driving performance scores, predicting driving performance for the driver on the driving route, may be calculated using the driving performance score(s) determined at block 252 and the route score(s) determined at block 254 (block 256). Block 256 may be performed by a unit similar to normalization unit 32 of FIG. 1, for example. In one embodiment where only a single driving performance score and only a single route score are determined, for example, a predicted driving performance score may be equal to the product of the two scores, divided by a constant (e.g., 100). As another example, in an embodiment where driving performance scores have been determined at block 252 for the contexts of driving on hills ("hill driving performance score," or HDPS), driving on curves ("curve driving performance score," or CDPS) and driving in heavy traffic ("traffic driving performance score," or TDPS), and where route scores have been determined at block 254 for hill difficulty ("hill route score," or HRS), curve difficulty ("curve route score," or CRS) and traffic difficulty ("traffic route score," or TRS), a predicted driving performance score (PDPS) may be calculated as: PDPS= (HDPS*HRS+CDPS*CRS+TDPS*TRS)/100. In other embodiments, however, other suitable algorithms may be used to calculate the predicted driving performance score.

Data may be sent, via a network, to a client device to cause the client device to display the predicted driving performance score(s) calculated at block 256, and/or the predicted driving performance score may be used to determine a risk rating for the driver of the vehicle (block 258). Block 258 may be performed by a unit similar to presentation unit 40 and/or action unit 42 of FIG. 1, and/or the client device may be a device similar to user device 16 of FIG. 1, for example. Block 258 may be similar to block 210 of the method 200, for example.

In some embodiments, the blocks of the method 250 are not performed in the order shown in FIG. 5. For example, block 252 may be performed after and/or in parallel with block 254. Moreover, in some embodiments, the method 250 may include one or more blocks not shown in FIG. 5. For example, in an embodiment where a risk rating is determined at block 258, the method 250 may include an additional block in which the risk rating is used to determine a future or quoted insurance policy premium (e.g., the total premium, or a premium discount, etc.) for the driver of the vehicle.

Figure 6:
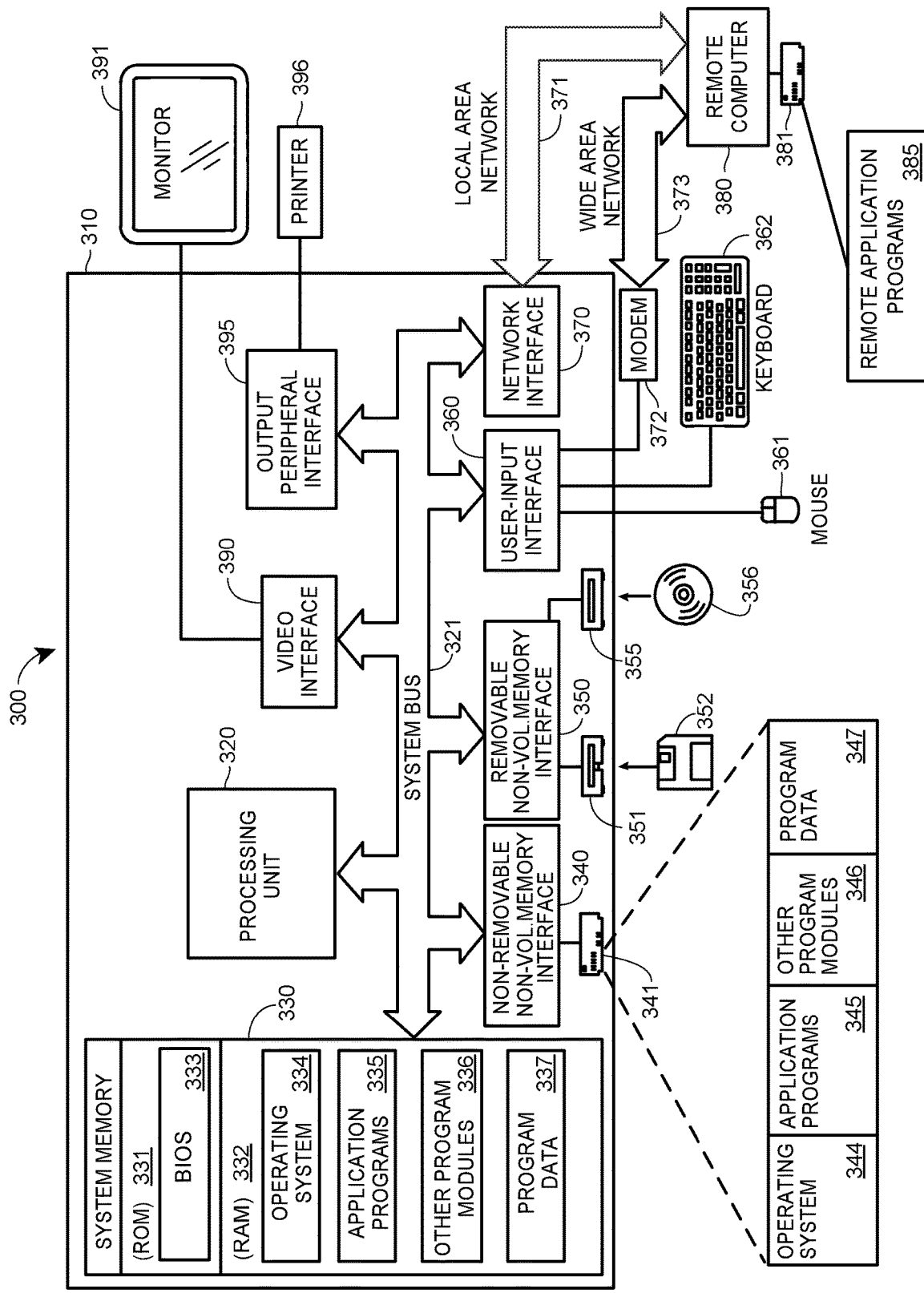
FIG. 6 depicts an exemplary computer system in which the techniques described herein may be implemented, according to an embodiment.

VII. Exemplary Computer System for Using Route Scoring to Assess and/or Predict Driving Performance FIG. 6 depicts an exemplary computer system 300 in which the techniques described herein may be implemented, according to an embodiment. The computer system 300 of FIG. 6 may include a computing device in the form of a computer 310. Components of the computer 310 may include, but are not limited to, a processing unit 320, a system memory 330, and a system bus 321 that couples various system components including the system memory 330 to the processing unit 320. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 may include a variety of computer-readable media. Computer-readable media may be any available media that can be accessed by computer 310 and may include both volatile and nonvolatile media, and both removable and non-removable media. By way of example, and not limitation, computer-readable media may comprise computer storage media and communication media. Computer storage media may include volatile and nonvolatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer-readable instructions, data structures, program modules or other data in a modulated data signal such as a carrier wave or other transport mechanism, and may include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared and other wireless media. Combinations of any of the above are also included within the scope of computer-readable media.

The system memory 330 may include computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 6 illustrates operating system 334, application programs 335, other program modules 336, and program data 337.

The computer 310 may also include other removable/non-removable, volatile/nonvolatile computer storage media. By way of example only, FIG. 6 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 6 provide storage of computer-readable instructions, data structures, program modules and other data for the computer 310. In FIG. 6, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and may include many or all of the elements described above relative to the computer 310, although only a memory storage device 381 has been illustrated in FIG. 6. The logical connections depicted in FIG. 6 include a local area network (LAN) 371 and a wide area network (WAN) 373, but may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 may include a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 6 illustrates remote application programs 385 as residing on memory device 381.

The techniques for using route scores to assess and/or predict driving performance described above may be implemented in part or in their entirety within a computer system such as the computer system 300 illustrated in FIG. 6. The computer 310 may be a computing device of a fleet manager or insurance provider employee (e.g., user device 16 of FIG. 1), for example, and the remote computer 380 may be a server device (e.g., within computing system 14 of FIG. 1) that receives driving data and route feature information, and determines raw driving performance scores, route scores, and normalized or predicted driving performance scores, etc. In some such embodiments, the LAN 371 or the WAN 373 may be omitted. Application programs 335 and 345 may include a software application (e.g., a web-browser application) that is included in user interface 18 of FIG. 1, for example. Computer 310 may receive from computer 380 data indicating normalized driving performance scores and/or ranks, and/or data indicating predicted driving performance scores, for example.

VIII. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process of using route scores to assess and/or predict driving performance. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method of assessing driving performance using route scoring, the method comprising:
   receiving, by one or more processors, driving data indicative of operation of a vehicle while the vehicle was driven on a driving route;
   receiving, by one or more processors, road infrastructure data indicative of one or more features of the driving route;
   calculating, by one or more processors and using the road infrastructure data, a numerical route score for the driving route, wherein the numerical route score indicates a difficulty level of the driving route based on the one or more features, wherein the one or more features comprises at least one of (i) road signage characteristics including a size of a sign and/or a size of letters on the sign, or (ii) bicycle lane characteristics including markings and/or location of a bicycle lane;
   calculating, by one or more processors and using (i) the driving data and (ii) the numerical route score for the driving route, a driving performance score for a driver driving the vehicle on the driving route; and
   at least one of
      sending, via a network and by one or more processors, data to a client device to cause the client device to display one or both of (i) the driving performance score, and (ii) a ranking based on the driving performance score, or
      using, by one or more processors, the driving performance score to determine a risk rating for the driver of the vehicle.

2. The computer-implemented method of claim 1, wherein calculating the driving performance score for the driver of the vehicle includes:
   calculating an initial driving performance score for the driver of the vehicle using the driving data; and
   normalizing the initial driving performance score using the numerical route score for the driving route.

3. The computer-implemented method of claim 1, further comprising:
   receiving, by one or more processors, additional driving data indicative of operation of the vehicle while the vehicle was driven on a different driving route;
   receiving, by one or more processors, additional road infrastructure data indicative of one or more features of the different driving route; and
   calculating, by one or more processors and using the additional road infrastructure data, a numerical route score for the different driving route,
   wherein the method includes calculating the driving performance score for the driver of the vehicle using (i) the driving data, (ii) the numerical route score for the driving route, (iii) the additional driving data, and (iv) the numerical route score for the different driving route.

4. The computer-implemented method of claim 1, wherein calculating a numerical route score for the driving route includes:
   calculating a plurality of route feature scores, including a respective route feature score for each of at least some of the one or more features of the driving route; and
   calculating the numerical route score using the plurality of route feature scores.

5. The computer-implemented method of claim 1, wherein receiving road infrastructure data indicative of one or more features of the driving route includes receiving road infrastructure data indicative of at least one of (i) whether a road on the driving route is a rural road, (ii) whether a road on the driving route is an interstate road, (iii) whether a road on the driving route is a highway, or (iv) whether a road on the driving route is a city street.

6. The computer-implemented method of claim 1, wherein receiving road infrastructure data indicative of one or more features of the driving route further includes receiving road infrastructure data indicative of at least one of (i) total length of the driving route, (ii) number of lanes, (iii) type of lane markings, (iv) changes in road elevation, (v) road curve characteristics, (vi) road intersection characteristics, or (vii) road surface characteristics.

7. The computer-implemented method of claim 6, wherein receiving road infrastructure data indicative of one or more features of the driving route includes receiving road infrastructure data indicative of road curve characteristics, the road curve characteristics including one or more of (i) frequency of road curves, (ii) angles of road curves, (iii)

lengths of road curves, (iv) apex locations of road curves, or (v) bank angles of road curves.

8. The computer-implemented method of claim 6, wherein receiving road infrastructure data indicative of one or more features of the driving route includes receiving road infrastructure data indicative of road intersection characteristics, the road intersection characteristics including one or more of (i) intervals between road intersections, (ii) whether road intersections have stoplights, or (iii) whether road intersections have four-way stops.

9. The computer-implemented method of claim 1, wherein the road surface characteristics include one or more road surface friction coefficients.

10. The computer-implemented method of claim 1, further comprising:
receiving, by one or more processors, driving conditions data indicative of at least one of (i) weather conditions along the driving route, (ii) a state of one or more roads along the driving route, (iii) construction along the driving route, or (iv) traffic along the driving route,
wherein the method includes calculating the numerical route score for the driving route using (i) the road infrastructure data, and (ii) the driving conditions data.

11. The computer-implemented method of claim 10, wherein receiving driving conditions data includes receiving driving conditions data indicative of at least one of (i) traffic density along the driving route, (ii) traffic direction along the driving route, (iii) speed of traffic along the driving route, or (iv) vehicle types in traffic along the driving route.

12. The computer-implemented method of claim 1, wherein receiving road infrastructure data includes receiving at least one of:
data that was collected by the vehicle from one or more road infrastructure communication devices; or
data that was collected using one or more sensors carried by the vehicle and configured to sense an environment external to the vehicle.

13. The computer-implemented method of claim 1, wherein receiving road infrastructure data includes:
receiving global positioning satellite (GPS) data from the vehicle;
using the GPS data to request the road infrastructure data from a remote server; and
receiving the road infrastructure data in response to the request.

14. The computer-implemented method of claim 1, wherein receiving driving data indicative of operation of the vehicle while driven on the driving route includes receiving driving data indicative of at least one of (i) acceleration of the vehicle while driven on the driving route, (ii) braking of the vehicle while driven on the driving route, or (iii) cornering of the vehicle while driven on the driving route.

15. A computer system for assessing driving performance using route scoring, the computer system comprising:
one or more processors;
one or more hardware communication interfaces configured to communicate data; and
a program memory coupled to the one or more processors and storing executable instructions that, when executed by the one or more processors, cause the computer system to
receive, via the one or more hardware communication interfaces, driving data indicative of operation of a vehicle while the vehicle was driven on a driving route,
receive, via the one or more hardware communication interfaces, road infrastructure data indicative of one or more features of the driving route,
calculate, using the road infrastructure data, a numerical route score for the driving route, wherein the numerical route score indicates a difficulty level of the driving route based on the one or more features, wherein the one or more features comprises at least one of (i) road signage characteristics including a size of a sign and/or a size of letters on the sign, or (ii) bicycle lane characteristics including markings and/or location of a bicycle lane,
calculate, using (i) the driving data and (ii) the numerical route score for the driving route, a driving performance score for a driver driving the vehicle on the driving route, and
at least one of
send, via the one or more communication interfaces, data to a client device to cause the client device to display one or both of (i) the driving performance score, and (ii) a ranking based on the driving performance score, or
use the driving performance score to determine a risk rating for the driver of the vehicle.

16. The computer system of claim 15, wherein the executable instructions cause the computer system to calculate the driving performance score at least by:
calculating an initial driving performance score for the driver of the vehicle using the driving data; and
normalizing the initial driving performance score using the numerical route score for the driving route.

17. The computer system of claim 15, wherein the executable instructions cause the computer system to calculate the numerical route score at least by:
calculating a plurality of route feature scores, including a respective route feature score for each of at least some of the one or more features of the driving route; and
calculating the numerical route score using the plurality of route feature scores.

18. The computer system of claim 15, wherein the road infrastructure data further includes data indicative of at least one of (i) total length of the driving route, (ii) number of lanes, (iii) type of lane markings, (iv) changes in road elevation, (v) road curve characteristics, (vi) road intersection characteristics, or (vii) road surface characteristics.

19. The computer system of claim 15, wherein the road surface characteristics include one or more road surface friction coefficients.

* * * * *